United States Patent [19]

Ito

[11] Patent Number: 5,177,672
[45] Date of Patent: Jan. 5, 1993

[54] STRUCTURE FOR COVERING INTERCONNECTION OF A FOLDING ELECTRONIC DEVICE

[75] Inventor: Toshihito Ito, Nara, Japan

[73] Assignee: Sharp Kabushiki Kaisha, Osaka, Japan

[21] Appl. No.: 731,779

[22] Filed: Jul. 18, 1991

[30] Foreign Application Priority Data

Jul. 20, 1990 [JP] Japan .................. 2-193370

[51] Int. Cl.⁵ .............................. H05K 1/14
[52] U.S. Cl. .................... 361/395; 361/392; 361/394; 361/398; 361/413; 364/708; 340/700; 439/31; 439/164
[58] Field of Search ......... 361/380, 392, 394, 395, 361/398, 399, 413; 364/708; 340/700; 439/31, 165, 164

[56] References Cited

U.S. PATENT DOCUMENTS 4,825,395 4/1989 Kinser, Jr. et al. .
4,961,126 10/1990 Suzuki .................. 361/398
4,996,522 2/1991 Sunano .................. 340/700

FOREIGN PATENT DOCUMENTS 2-46221 9/1988 Japan .

Primary Examiner—Leo P. Picard
Assistant Examiner—Young S. Whang
Attorney, Agent, or Firm—Nixon & Vanderhye

[57] ABSTRACT

A structure for covering an interconnection of a folding electronic device includes a main body and a cover member each having a flat internal cavity coupled to each other rotatably at each back end. Circuit substrates in respective internal cavities are electrically connected to each other by the interconnection sheet disposed traversing a window opening provided at the back end of the main body. A cover unit guarding the interconnection sheet is provided in the proximity of the window opening in the main body. This cover unit includes a cover plate biased elastically to protrude outwards from the window opening. By a guide edge provided at the back end of the cover member to be abutted against the cover plate according to the closing/opening operation of the cover member, the cover plate blocks the window opening to prevent exposure of the wiring sheet.

6 Claims, 8 Drawing Sheets

STRUCTURE FOR COVERING INTERCONNECTION OF A FOLDING ELECTRONIC DEVICE

BACKGROUND OF THE INVENTION

1. Field of the Invention

The present invention relates to a structure for covering an interconnection of a folding electronic device such as a book-type electronic organizer, and more particularly, to a structure for covering and protecting a sheet-like interconnection provided in the hinge portion of a folding electronic device.

2. Description of the Background Art

A folding electronic device is generally employed in book-type electronic organizers, pocket-type computers and the like (refer to U.S. Pat. No. 4,825,395, for example). A first conventional example of a folding electronic device will be explained hereinafter with reference to FIGS. 1-4.

FIG. 1 is a plan view of a first conventional folding electronic device having its cover member opened. This folding electronic device comprises a main body 1 and a cover member 2. A back plate 3 of main body 1 is connected to a back plate 4 of cover member 2 by hinges 5. Hinges 5 are provided at both ends of back plates 3 and 4 of main body 1 and cover member 2, respectively, so that cover member 2 can be opened/closed arbitrarily with respect to body 1.

Main body 1 is provided with a display 6. Cover member 2 is provided with various operating keys 7. The depression of operating keys 7 will cause appropriate information to be displayed on display 6.

FIG. 2 is a side view of a first conventional folding electronic device of FIG. 1 having its cover member 2 closed. Referring to FIG. 2, cover member 2 is opened or closed by being rotated around rotation axis 8 of hinge 5 in the directions of arrows A or B.

FIG. 3 is a plan view of the folding electronic device of FIGS. 1 and 2 with cover member 2 closed. FIG. 4 is a sectional view taken along line IV—IV of FIG. 3. The structures of main body 1 and cover member 2 will be explained hereinafter with reference to FIG. 4.

Main body 1 accommodates a circuit substrate 1 in a flat cavity formed between an outer cabinet 9 and an inner cabinet 10. Similarly, cover member 2 accommodates a circuit substrate 14 in a flat cavity formed between an outer cabinet 12 and an inner cabinet 13. Circuit substrates 11 and 14 are electrically connected to each other by an interconnection sheet 17 disposed via through-openings 15 and 16 provided in the proximity of back plates 3 and 4 of inner cabinets 10 and 13. A gap of approximately 1 mm is required at the connection portion between the back ends of cover member 2 smoothly and main body 1 to carry out the opening and closing operation of cover member 2 in a folding electronic device having the above-described structure. Such electronic devices had a disadvantage that interconnection sheet 17 is exposed at the above-described connection portion to spoil its appearance when cover member 2 is closed. There was also a disadvantage that interconnection sheet 17 is susceptible to damage. The protrusion of hinge 5 from the profile of main body 1 and cover member 2 also spoils the appearance of the device and inducing the possibility of damage of hinge 5.

A second conventional folding electronic device (disclosed in Japanese Utility Model Laying-Open No. 2-46221 (1990)) improving the problems of the above-described first conventional example will be explained hereinafter with reference to FIGS. 5-10.

The second conventional folding electronic device is shown in FIGS. 5 and 6 having the cover member opened and closed, respectively. FIG. 7 is a plan view of the second conventional folding electronic device, and FIG. 8 is a sectional view taken along line VIII—VIII of FIG. 7. Referring to these figures, the second conventional folding electronic device comprises a main body 31 and a cover member 32 coupled by hinges 35 to be opened/closed arbitrarily. A back end 34 of an outer cabinet 50 of cover member 32 is located at an outer position of a rotation center axis 38 of hinge 35. A back end 33 of an outer cabinet 42 of main body 31 is located at an inner position of rotation center axis 38 of hinge 35. Back ends 33 and 34 are provided to oppose each other in a grade separation manner sandwiching hinge 35. The outside wall of back end 34 of cover member 32 has a rounded configuration to comply with the circular arc centered about the rotation of hinge 35. Main body 31 accommodates a circuit substrate 44 in a flat cavity formed between an outer cabinet 42 and inner cabinet 43. Similarly, cover member 32 accommodates a circuit substrate 51 is a flat cavity formed between an outer cabinet 50 and an inner cabinet 49. Circuit substrates 44 and 51 are electrically connected to each other by an interconnection sheet 53 disposed through through-openings 45 and 40 provided in inner cabinets 43 and 49, respectively.

In the proximity of hinge 35 in main body 31, a closure member 41 is provided slidably in a direction at right angles to rotation axis 38 of hinge 35 and in a direction at right angles to the rising direction of back end 33 of main body 31. Closure member 41 has a step-like configuration. The bottom planes of upper step 41c and lower step 41a are slidable and abutted against the upper end plane of back end 33 and the inside wall of outer cabinet 42, respectively. A spring supporter 48 is fixed in outer cabinet 42. A coil spring 55 is disposed between spring supporter 48 and the upright portion 41b of closure member 41. Coil spring 55 causes closure member 41 to be always biased towards back end 34 of cover member 32, so that the leading edge portion of upper step 41c always comes into contact with the back end 34. This causes closure member 41 to move with the change of location of back end 34 of cover member 32. Closure member 41 slides to shield the gap formed between back ends 33 and 34 according to the magnitude thereof.

Such a cover structure in which closure member 41 slides into main body 31 requires space where closure member 41 is withdrawn inside main body 31. Space is also necessary to provide coil spring 55 at one end of closure member 41. This results in a folding electronic device wider in the breadthwise dimension, with the problem of greater space inside main body 31.

Because closure member 41 slides against the inside surface of main body 31, disturbing noise may be generated due to friction when there is error in dimensions of each component and unbalance in assembly. This results in poor usability.

There is also a problem that the assembly is complicated because closure member 41 and coil spring 55 are separate components to be coupled and incorporated within main body 31. If this incorporation is not carried out appropriately, the above-described disturbing noise may be generated.

SUMMARY OF THE INVENTION

An object of the present invention is to provide a structure for covering the interconnection of a folding electronic device that can be incorporated easily into a small space within the main body, and that does not generate disturbing noise in opening/closing the cover member.

A structure of interconnection cover of a folding electronic device according to the present invention includes a main body and a cover member, each having a flat internal cavity, coupled to each other rotatably at each back end. The back end of the main body is provided with a window opening. An interconnection sheet is provided traversing this window opening from the internal cavity of the main body to the internal space of the cover member. There is also a cover unit that covers and protects the interconnection sheet. The cover unit includes a base plate fixed in the proximity of the back end in the internal cavity of the main unit, a cover plate attached slidably at the back end of the base plate, and an elastic biasing member mounted between the cover plate and the base plate for biasing the cover plate in a direction protruding from the window opening. The back end of the cover member includes a guide edge that passes through the window opening inside the main body according to its rotation operation. The cover unit externally covers the interconnection sheet in the proximity of the back end of the main body. The cover plate is abutted against the guide edge of the cover member by bias of the elastic biasing member to shield the gap between the guide edge and the cover plate.

According to the present invention of the above-described structure, the cover plate, the base plate and the elastic biasing member are coupled to each other to form a unit. Only the base plate of the components forming the cover unit is to be fixed inside the main body in assembly.

When the cover member is rotated from the closed state to the opened state, the guide edge of the cover member moves through a window opening from the outside to the inside of the main body, as described in the following operation.

In the case where the cover member is closed, the back end of the cover member is remote from the main body, and the cover plate slides due to the biasing elasticity of the elastic biasing member to protrude outside through the window opening of the main body to shield the gap between the guide edge and the cover plate. In opening the cover member, the guide edge approaches the main body, whereby the cover plate is pressed by the guide edge to withdraw inside the window opening.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be explained hereinafter with reference to FIGS. 5, 7, and 11-15.

Figure 1:
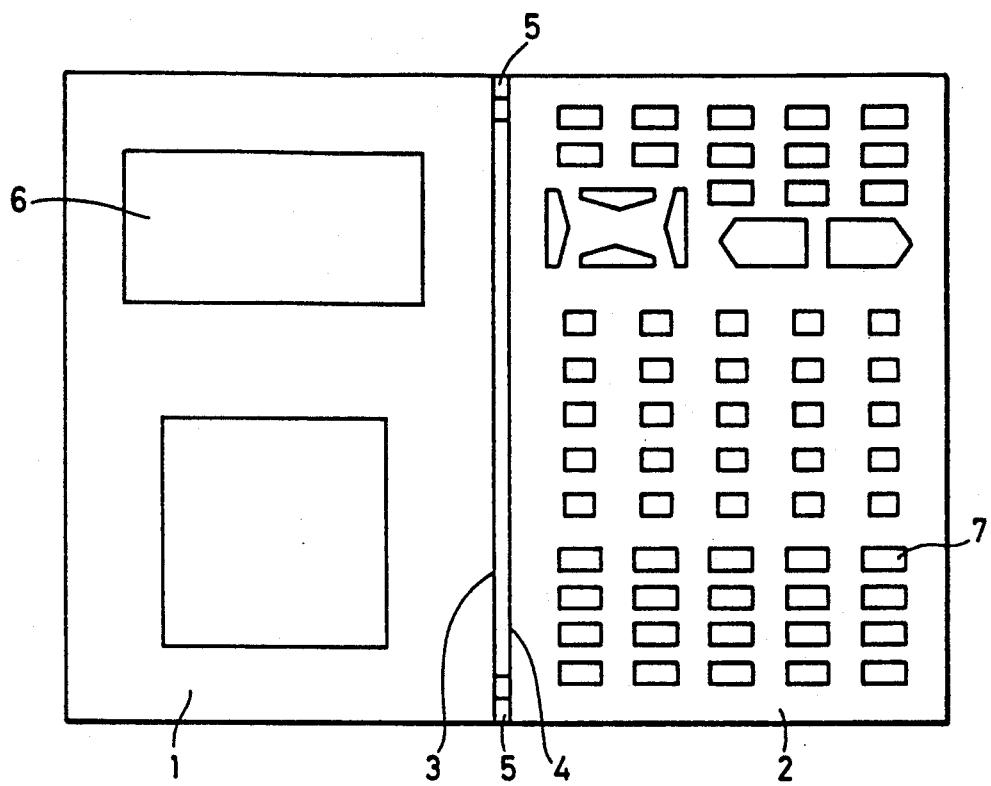
FIG. 1 is a plan view of a first conventional folding electronic device with a cover member opened.
Figure 2:
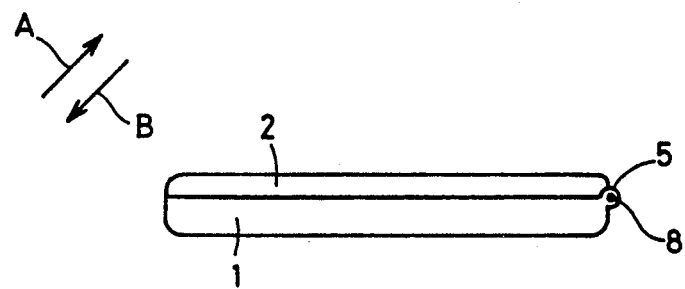
FIG. 2 is a side view of the first conventional folding electronic device with the cover member closed.
Figure 3:
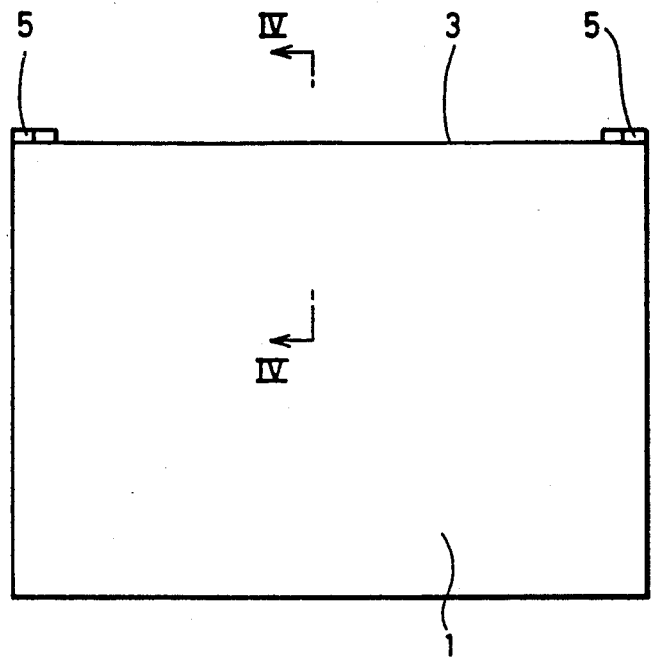
FIG. 3 is a plan view of the first conventional folding electronic device with the cover member closed.
Figure 4:
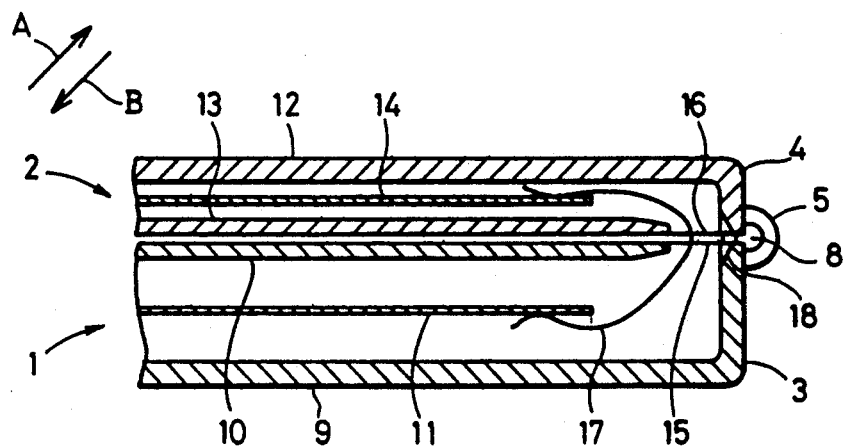
FIG. 4 is a sectional view of the first conventional folding electronic device taken along line IV—IV of FIG. 3.
Figure 5:
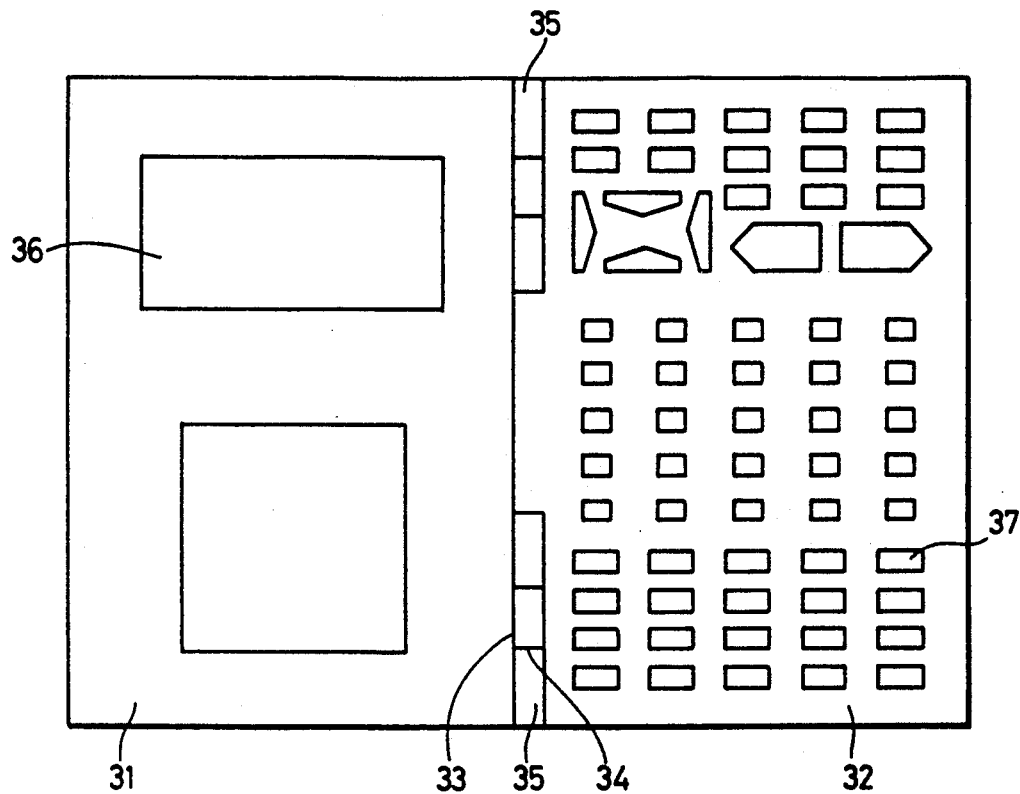
FIG. 5 is a plan view of a second conventional folding electronic device with the cover member opened.
Figure 6:
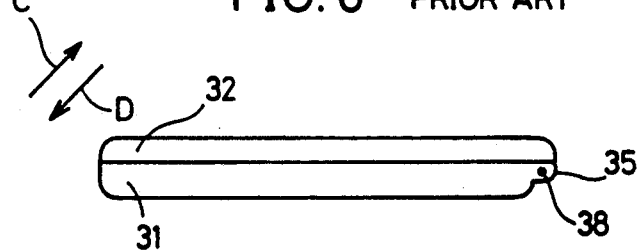
FIG. 6 is a side view of a second conventional folding electronic device with the cover member closed.
Figure 7:
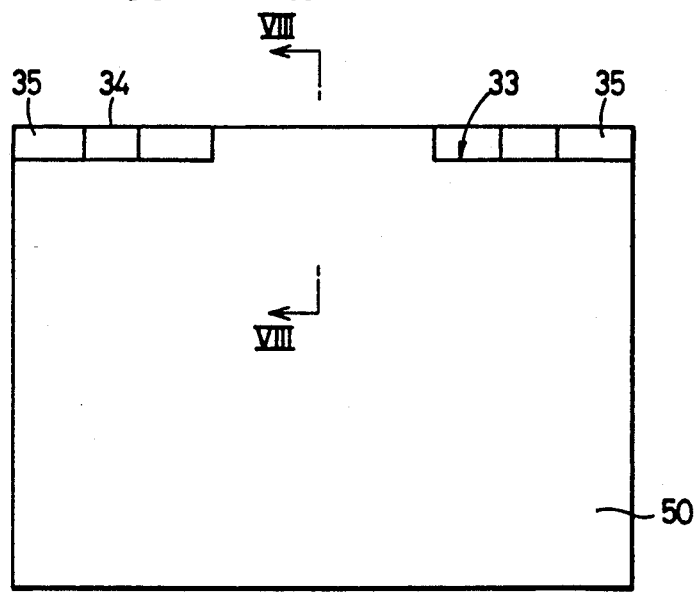
FIG. 7 is a plan view of a second conventional folding electronic device with the cover member closed.
Figure 8:
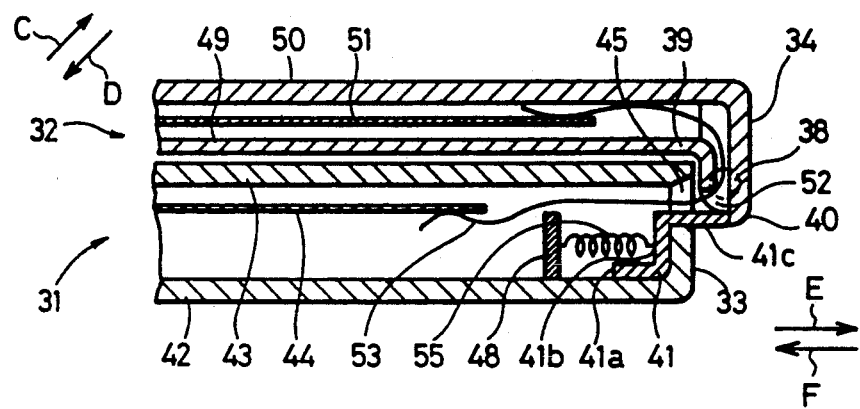
FIG. 8 is a sectional view of the second conventional folding electronic device taken along line VIII—VIII of FIG. 7.
Figure 9:
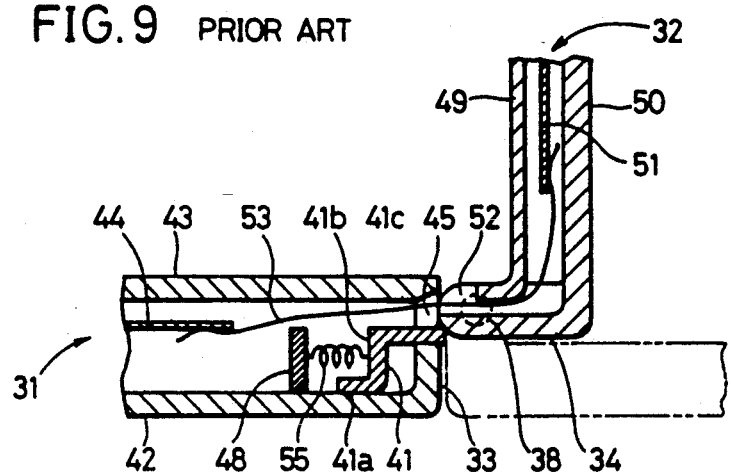
FIG. 9 is a sectional view of the second conventional folding electronic device taken along line VIII—VIII of FIG. 7 with the cover member opened 90°.
Figure 10:
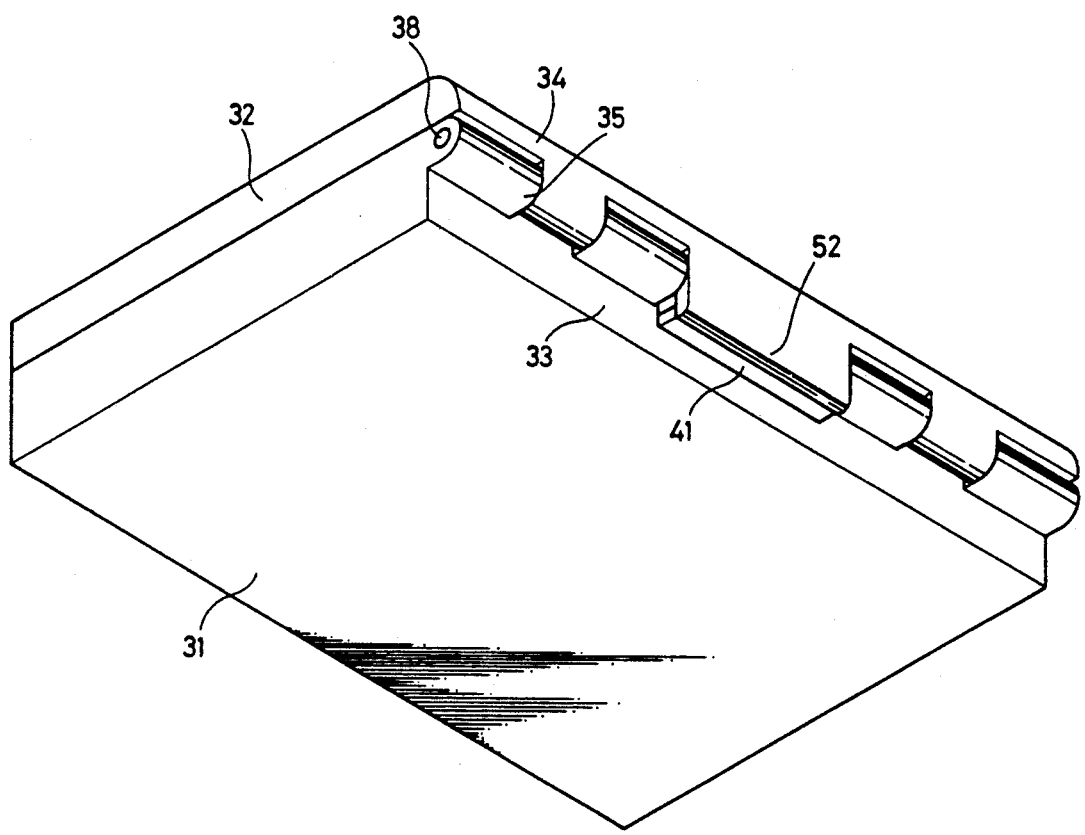
FIG. 10 is a perspective view of the second conventional folding electronic device seen from the bottom.
Figure 11:
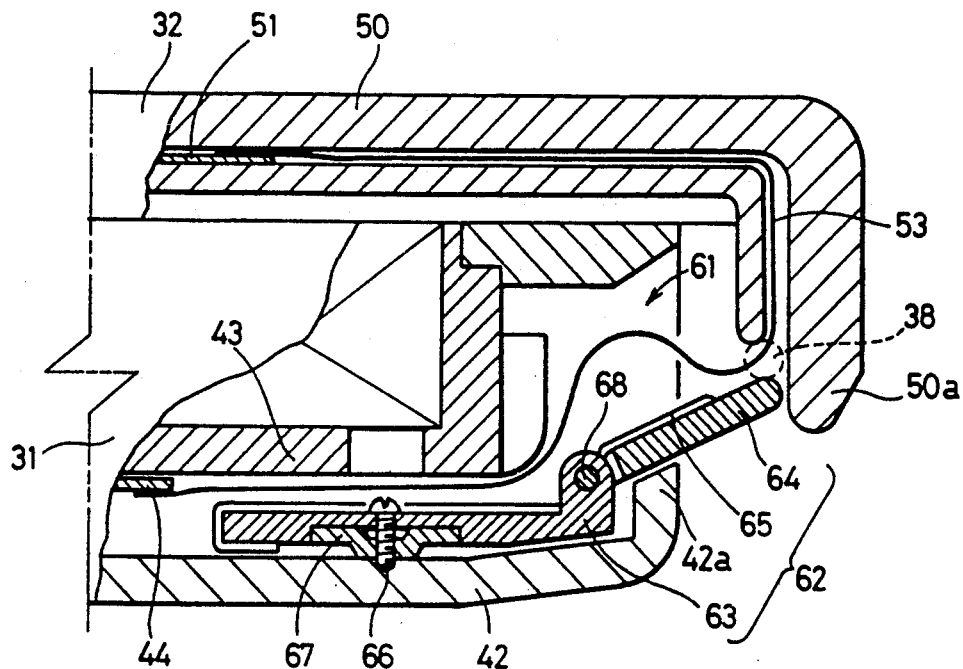
FIG. 11 is a sectional view of a folding electronic device according to an embodiment of the present invention taken along line VIII—VIII of FIG. 7.
Figure 12:
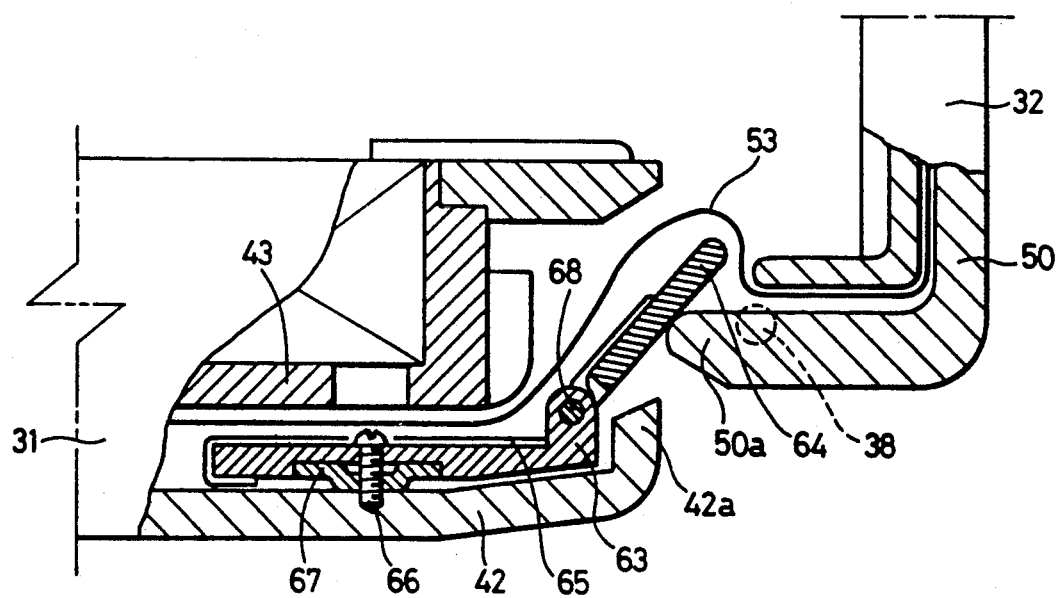
FIG. 12 is a sectional view of FIG. 11 with the cover member opened 90°.
Figure 13:
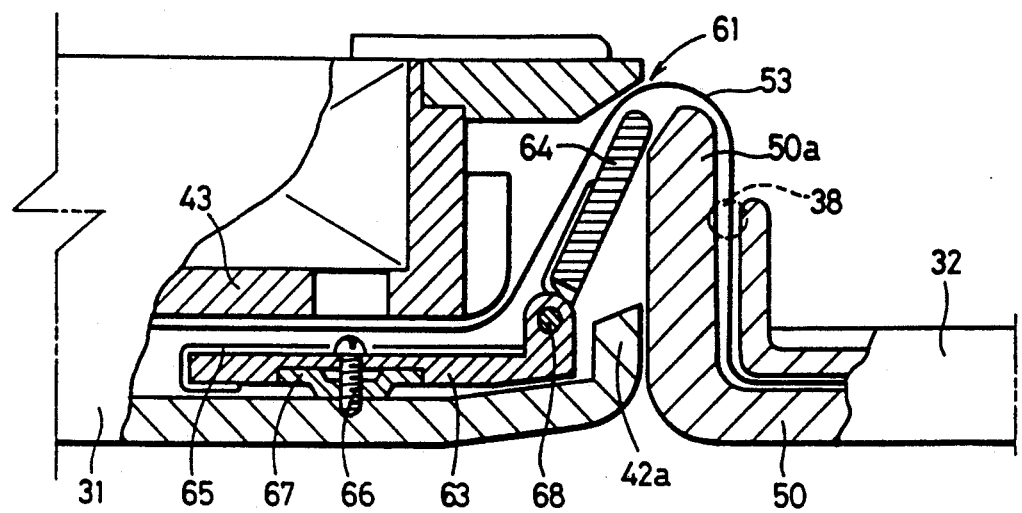
FIG. 13 is a sectional view of FIG. 11 with the cover member opened 180°.

The plan view where cover member is opened and the bottom plan view where the cover member is closed of a folding electronic device according to the present invention are similar to those of FIGS. 5 and 7 shown in the above-described second conventional example. Components in FIGS. 1-15 common to those of the second conventional example have the same reference numbers denoted. FIGS. 11-13 show the sectional views of a folding electronic device where cover member 32 is closed, opened 90°, and opened 180°, respectively. Referring to FIGS. 11-15, main body 31 and cover member 32 have respective back ends rotatably coupled to each other by hinges 35 around rotation center axis 38.

A circuit substrate 44 is accommodated in a flat cavity formed between outer cabinet 42 and inner cabinet 43 of main body 31. A circuit substrate 51 is accommodated in a flat cavity formed between outer cabinet 50 and inner cabinet 49 of cover member 32. Circuit substrates 44 and 51 are electrically connected to each other by an interconnection sheet 53 disposed through a window opening 61 provided in the back end of main body 31.

In the structure of interconnection cover of the folding electronic device of the present embodiment, a cover unit 62 is provided in the proximity of the back end of main body 31 between outer cabinet 42 and interconnection sheet 53. Cover unit 62 comprises a base plate 63, a cover plate 64, and a spring 65.

Base plate 63 is located between outer cabinet 42 and inner cabinet 43 of main body 31, and is affixed by fixing means such as a screw 66 to outer cabinet 42 of main body 31. There is a mounting washer 67 between base plate 63 and outer cabinet 42 at the position fastened by screw 66.

Cover plate 64 is coupled slidably to one end of base plate 63 by an axis 68. The idle end of cover plate 64 protrudes outwards from window opening 61 beneath interconnection sheet 53. When cover member 32 is closed, the outside surface of cover plate 64 abuts against a stopper 42a provided at the back end of outer cabinet 42. Cover plate 64 is held at a constant protruding position.

Figure 14:
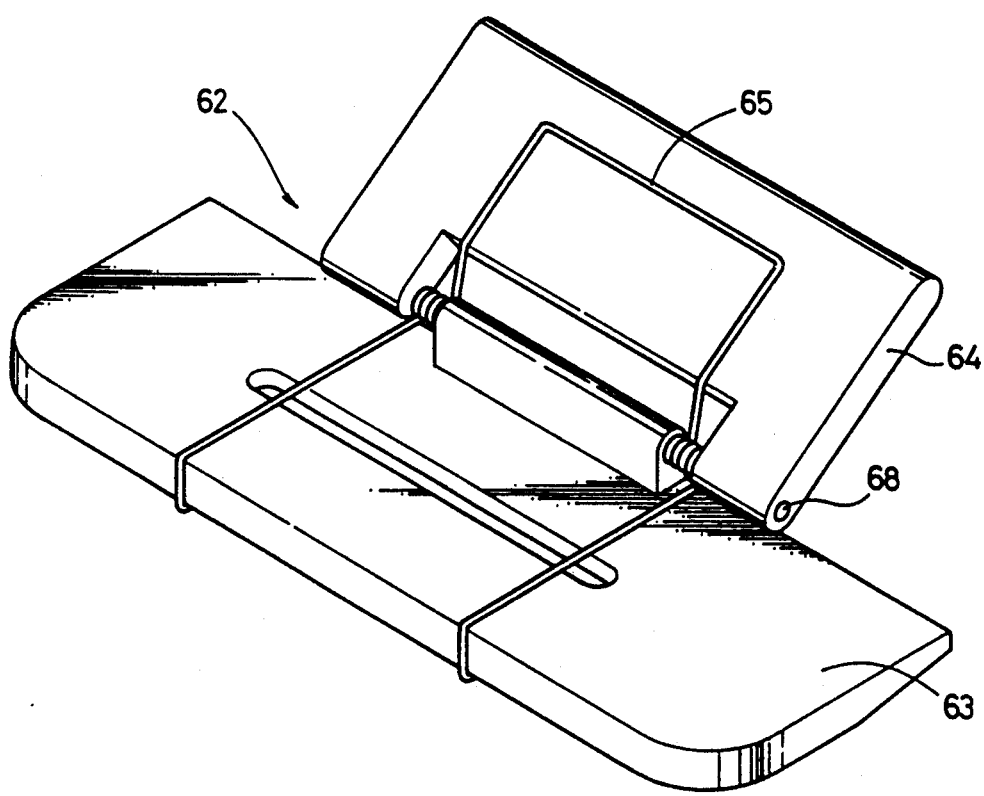
FIG. 14 is a perspective view of a cover unit of a folding electronic device according to an embodiment of the present invention.
Figure 15:
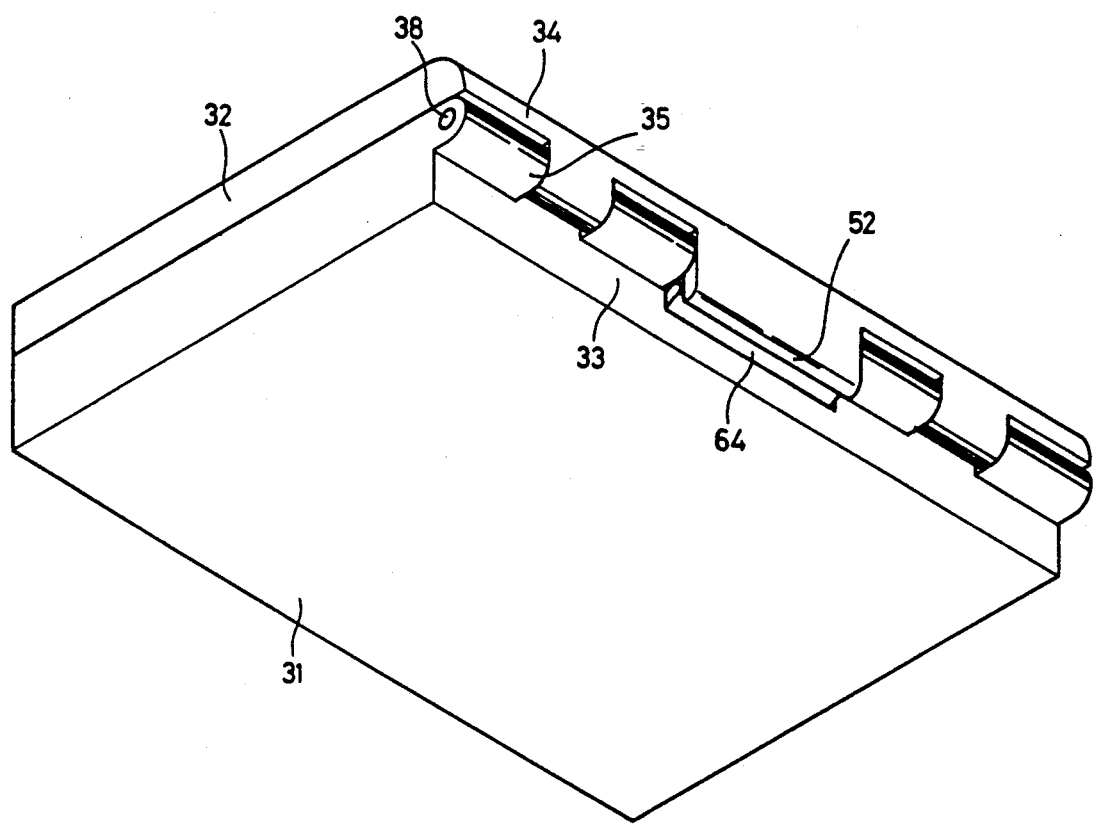
FIG. 15 is a perspective view of a folding electronic device according to an embodiment of the present invention seen from the bottom.

As shown in FIG. 14, spring 65 is a torsion spring having a spiral portion, fixed to base plate 63 and cover plate 64 with the spiral portion wound around axis 68. Spring 65 biases cover plate 64 elastically in a direction towards window opening 61 (the clockwise direction in FIGS. 11-13).

Base plate 63, cover plate 64, and spring 65 are coupled to each other as shown in FIG. 14 to implement cover unit 62. In incorporating cover unit 62, cover plate 64 can be easily positioned at a predetermined position in the proximity of window opening 61 by fixing base plate 63 to outer cabinet 42 of main body 31.

When cover member 32 is closed, guide edge 50a located at the back end of outer cabinet 50 of cover member 32 is spaced apart from main body 31 to form a gap between window opening 61 and guide edge 50a, as shown in FIG. 11. However, interconnection sheet 53 is not exposed externally because cover plate 64 slides in the clockwise direction by the energization elasticity of spring 65 to protrude outwards from window opening 61 to shield the gap between guide edge 50a and window opening 61.

When cover member 32 is opened approximately 90° as shown in FIG. 12, guide edge 50a of the back end of outer cabinet 50 of cover member 32 is abutted against the outer surface of cover plate 64 to bias cover plate 64 inwards to window opening 61 so that interconnection sheet 53 is not exposed outside (downwards in FIG. 12). When cover member 32 is opened 180° as shown in FIG. 13, window opening 61 is blocked substantially by guide edge 50a which is abutted against cover plate 64 to further reduce the exposing area of interconnection sheet 53. In this case, cover plate 64 is pressed by guide edge 50a to slide counter clockwise and withdraws inside window opening 61. The idle end of cover plate 64 and the leading edge portion of guide edge 50a are at substantially the same height and in the closest proximity in this state. By virtue of this arrangement, deformation of interconnection sheet 53 along the mountain formed by cover plate 64 and guide edge 50a is relatively moderate even when cover member 32 is opened completely.

Thus, cover plate 64 rotates around axis 68 which is the pivotally-mounted portion of cover plate 64 and base plate 63 in opening/closing cover member 32 to substantially eliminate friction noise, in comparison with the structure of the aforementioned second conventional example in which closure member 41 slides. The sliding contact with cover plate 64 is further improved due to the leading edge of guide edge 50a formed of a curved surface such as a cylindrical plane.

As set forth throughout the present specification, the present embodiment has a structure in which cover plate 64 slides to be withdrawn in window opening 61 to be folded. It is therefore not necessary to ensure a large space in main body 31 in which cover plate 64 is to be withdrawn. It is also not necessary to provide spring 65 inwards of main body 31 from one end of cover plate 64. This will reduce the breadthwise dimension of the folding electronic device. The cover unit can be incorporated into a small space in main body 31.

Base plate 63, cover plate 64, and spring 65 implemented as a unit facilitates incorporation thereof since only base plate 63 of cover unit 62 is required to be fixed to main body 31. Because this incorporation is stable, the disadvantage of different assemblies for each product is eliminated.

Because cover plate 64 slides around the pivotally-mounted portion with respect to base plate 63 in opening/closing cover member 32, disturbing noise such as friction noise are not generated, leading to favorable usability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A structure for covering an interconnection sheet of a folding electronic device, comprising:
   a main body including a flat cavity and a window opening at the back end thereof;
   a cover member including a flat cavity coupled rotatably at the back end thereof to the back end of said main body;
   the interconnection sheet disposed through said window opening from an internal cavity of said main body to said flat cavity of said cover member; and
   a cover unit protecting said interconnection sheet in the proximity of the back end of said main body;
   said cover unit including:
   a base plate fixed in the proximity of the back end of said internal cavity of said main body;
   a cover plate attached slidably at the back end of said base plate; and
   elastic biasing means fixed between said cover plate and said base plate for biasing said cover plate elastically away from said window opening;
   wherein the back end of said cover member includes a guide edge movable into and out of said window opening according to the rotation of said cover member,
   wherein said cover plate abuts against said guide edge of said cover member by bias of said elastic biasing means to cover any gap between said guide edge and said cover plate.

2. The structure for covering the interconnection sheet of the folding electronic device according to claim 1, wherein
   said elastic biasing means comprises a torsion spring having a spiral portion and two extending portions extending bidirectionally from said spiral portion;
   said spiral portion is disposed at the connection portion of said base plate and said cover plate; and
   said two extending portions are fixed to said base plate and said cover plate, respectively.

3. The structure for covering the interconnection sheet of the folding electronic device according to claim 1, wherein a stopper member is formed at said back end of said main body at the inner circumference of said window opening for abutting against said cover plate of said cover unit preventing rotation thereof when said cover member is closed.

4. The structure for covering the interconnection sheet of the folding electronic device according to claim 1, wherein said guide edge includes a curved leading edge.

5. The structure for covering the interconnection sheet of the folding electronic device according to claim 1, wherein said cover plate and said guide edge shield a major portion of said window opening when said cover member is opened 180°.

6. The structure for covering the interconnection sheet of the folding electronic device according to claim 5, wherein an idle end of said cover plate and the curved leading edge of said guide edge are in closest proximity when said cover member is opened 180°.

* * * * *